United States Patent
Spink et al.

(10) Patent No.: US 8,003,274 B2
(45) Date of Patent: Aug. 23, 2011

(54) DIRECT LIQUID FUEL CELL

(75) Inventors: Scott A. Spink, Spokane, WA (US);
David R. Lott, Spokane, WA (US);
William A. Fuglevand, Spokane, WA (US)

(73) Assignee: ReliOn, Inc., Spokane, WA (US)

( * ) Notice: Subject to any disclaimer, the term of this patent is extended or adjusted under 35 U.S.C. 154(b) by 745 days.

(21) Appl. No.: 11/978,124

(22) Filed: Oct. 25, 2007

(65) Prior Publication Data
US 2009/0169941 A1 Jul. 2, 2009

(51) Int. Cl.
*H01M 4/94* (2006.01)
(52) U.S. Cl. .................................. 429/481; 429/534
(58) Field of Classification Search ............ 429/480, 429/481, 534
See application file for complete search history.

(56) References Cited

U.S. PATENT DOCUMENTS

| | | |
|---|---|---|
| 3,061,658 A | 10/1962 | Blackmer |
| 3,134,697 A | 5/1964 | Niedrach |
| 3,183,123 A | 5/1965 | Haworth |
| 3,297,487 A | 1/1967 | Pomeroy et al. |
| 3,346,421 A | 10/1967 | Thompson et al. |
| 3,380,856 A | 4/1968 | Pohl |
| 3,494,174 A | 2/1970 | Green et al. |
| 3,645,796 A | 2/1972 | Bohm et al. |
| 3,668,905 A | 6/1972 | Schlunke |
| 3,756,579 A | 9/1973 | Remick |
| 4,017,426 A * | 4/1977 | Carbonnel et al. ....... 252/520.22 |
| 4,076,899 A | 2/1978 | Kring |
| 4,192,906 A | 3/1980 | Maru |
| 4,243,508 A | 1/1981 | Dankese |
| 4,252,868 A | 2/1981 | Bohm et al. |
| 4,276,355 A | 6/1981 | Kothmann et al. |
| 4,310,605 A | 1/1982 | Early et al. |
| 4,324,636 A | 4/1982 | Dankese |
| 4,324,844 A | 4/1982 | Kothmann |
| 4,444,851 A | 4/1984 | Maru |
| 4,508,793 A | 4/1985 | Kumata et al. |
| H000016 H * | 1/1986 | Kaun .................. 429/534 X |
| 4,590,135 A | 5/1986 | Warszawski et al. |
| 4,599,282 A | 7/1986 | Hirota et al. |
| 4,604,332 A | 8/1986 | Warszawski et al. |
| 4,640,873 A | 2/1987 | Tajima et al. |
| 4,640,876 A | 2/1987 | Warzawski et al. |
| 4,642,274 A | 2/1987 | Tsutsumi et al. |
| 4,647,359 A | 3/1987 | Lindstrom |

(Continued)

FOREIGN PATENT DOCUMENTS

EP 1498971 1/2005
(Continued)

OTHER PUBLICATIONS

U.S. Appl. No. 11/284,173, filed Nov. 21, 2005, Fuglevand et al.

(Continued)

*Primary Examiner* — Stephen J. Kalafut

(57) ABSTRACT

A direct liquid fuel cell is disclosed and wherein the fuel cell includes an anode fluid diffusion layer positioned adjacent to the anode side of the membrane electrode assembly, and which consists of, at least in part, a porous electrically conductive ceramic material which is substantially devoid of predetermined fluid passageways. A source of an aqueous hydrocarbon fuel solution is coupled in direct fluid flowing relation relative to the anode fluid diffusion layer, and the anode fluid diffusion layer substantially evenly distributes the aqueous hydrocarbon fuel solution across the active area surface of the anode side of the membrane electrode assembly.

23 Claims, 2 Drawing Sheets

U.S. PATENT DOCUMENTS

| | | |
|---|---|---|
| 4,648,955 A | 3/1987 | Maget |
| 4,661,411 A | 4/1987 | Martin et al. |
| 4,670,702 A | 6/1987 | Yamada et al. |
| 4,686,158 A | 8/1987 | Nishi et al. |
| 4,719,157 A | 1/1988 | Tsutsumi et al. |
| 4,722,873 A | 2/1988 | Matsumura |
| 4,727,191 A | 2/1988 | Nalepa |
| 4,728,585 A | 3/1988 | Briggs |
| 4,746,363 A | 5/1988 | DeAngelis |
| 4,769,297 A | 9/1988 | Reiser et al. |
| 4,795,536 A | 1/1989 | Young et al. |
| 4,797,185 A | 1/1989 | Polak et al. |
| 4,797,190 A | 1/1989 | Peck |
| 4,804,592 A | 2/1989 | Vanderborgh et al. |
| 4,818,637 A | 4/1989 | Molter et al. |
| 4,826,741 A | 5/1989 | Aldhart et al. |
| 4,826,742 A | 5/1989 | Reiser |
| 4,849,253 A | 7/1989 | Maricle et al. |
| 4,849,308 A | 7/1989 | Schmitten et al. |
| 4,863,813 A | 9/1989 | Dyer |
| 4,873,155 A | 10/1989 | Hirota et al. |
| 4,876,115 A | 10/1989 | Raistrick |
| 4,894,355 A | 1/1990 | Takeuchi et al. |
| 4,927,793 A | 5/1990 | Hori et al. |
| 4,973,530 A | 11/1990 | Vanderborgh et al. |
| 4,973,531 A | 11/1990 | Zaima et al. |
| 4,982,309 A | 1/1991 | Shepherd |
| 4,983,472 A | 1/1991 | Katz et al. |
| 4,994,331 A | 2/1991 | Cohen |
| 4,997,728 A | 3/1991 | Onoda et al. |
| 5,009,968 A | 4/1991 | Guthrie et al. |
| 5,049,459 A | 9/1991 | Akagi |
| 5,053,294 A | 10/1991 | Sernka et al. |
| 5,069,985 A | 12/1991 | Cohen et al. |
| 5,084,144 A | 1/1992 | Reddy et al. |
| 5,085,950 A | 2/1992 | Primdahl |
| 5,094,928 A | 3/1992 | Dyer |
| 5,117,482 A | 5/1992 | Hauber |
| 5,132,193 A | 7/1992 | Reddy et al. |
| 5,164,060 A | 11/1992 | Eisman et al. |
| 5,185,220 A | 2/1993 | Schora |
| 5,187,025 A | 2/1993 | Kelland et al. |
| 5,190,834 A | 3/1993 | Kendall |
| 5,192,627 A | 3/1993 | Perry, Jr. et al. |
| 5,200,278 A | 4/1993 | Watkins et al. |
| 5,219,673 A | 6/1993 | Kaun |
| 5,232,792 A | 8/1993 | Reznikov |
| 5,234,777 A | 8/1993 | Wilson |
| 5,242,764 A | 9/1993 | Dhar |
| 5,246,792 A | 9/1993 | Watanabe |
| 5,248,566 A | 9/1993 | Kumar et al. |
| 5,252,410 A | 10/1993 | Wilkinson et al. |
| 5,262,249 A | 11/1993 | Beal et al. |
| 5,264,299 A | 11/1993 | Krasij et al. |
| 5,266,421 A | 11/1993 | Townsend et al. |
| 5,270,131 A | 12/1993 | Diethelm et al. |
| 5,272,017 A | 12/1993 | Swathirajan et al. |
| 5,273,837 A | 12/1993 | Aitken et al. |
| 5,286,568 A | 2/1994 | Bacino et al. |
| 5,286,579 A | 2/1994 | Akagi |
| 5,292,600 A | 3/1994 | Kaufman |
| 5,302,269 A | 4/1994 | Eisman et al. |
| 5,304,430 A | 4/1994 | Ludwig |
| 5,316,869 A | 5/1994 | Perry, Jr. et al. |
| 5,316,871 A | 5/1994 | Swathirajan et al. |
| 5,330,860 A | 7/1994 | Grot et al. |
| 5,336,570 A | 8/1994 | Dodge, Jr. |
| 5,338,622 A | 8/1994 | Hsu et al. |
| 5,344,721 A | 9/1994 | Sonai et al. |
| 5,346,780 A | 9/1994 | Suzuki |
| 5,350,643 A | 9/1994 | Imahashi et al. |
| 5,358,620 A | 10/1994 | Golovin et al. |
| 5,358,799 A | 10/1994 | Gardner |
| 5,364,711 A | 11/1994 | Yamada et al. |
| 5,366,818 A | 11/1994 | Wilkinson et al. |
| 5,372,896 A | 12/1994 | Binder et al. |
| 5,378,247 A | 1/1995 | Sasaki et al. |
| 5,382,478 A | 1/1995 | Chow et al. |
| 5,395,705 A | 3/1995 | Door et al. |
| 5,403,675 A | 4/1995 | Ogata et al. |
| 5,413,878 A | 5/1995 | Williams et al. |
| 5,419,980 A | 5/1995 | Okamoto et al. |
| 5,432,020 A | 7/1995 | Fleck et al. |
| 5,436,086 A | 7/1995 | Seymour et al. |
| 5,449,697 A | 9/1995 | Noaki et al. |
| 5,462,815 A | 10/1995 | Horiuchi |
| 5,470,671 A | 11/1995 | Fletcher et al. |
| 5,470,672 A | 11/1995 | Naoumidis |
| 5,482,792 A | 1/1996 | Faita et al. |
| 5,484,666 A | 1/1996 | Gibb et al. |
| 5,486,430 A | 1/1996 | Gorbell et al. |
| 5,500,292 A | 3/1996 | Muranaka et al. |
| 5,503,945 A | 4/1996 | Petri et al. |
| 5,514,487 A | 5/1996 | Washington et al. |
| 5,523,175 A | 6/1996 | Beal et al. |
| 5,525,436 A | 6/1996 | Savinell et al. |
| 5,532,072 A | 7/1996 | Spaeh et al. |
| 5,534,362 A | 7/1996 | Okamoto et al. |
| 5,543,238 A | 8/1996 | Strasser |
| 5,543,239 A | 8/1996 | Virkar et al. |
| 5,543,240 A | 8/1996 | Lee et al. |
| 5,547,776 A | 8/1996 | Fletcher et al. |
| 5,547,777 A | 8/1996 | Richards |
| 5,561,202 A | 10/1996 | Helmer-Metzmann et al. |
| 5,565,072 A | 10/1996 | Faita et al. |
| 5,578,388 A | 11/1996 | Faita et al. |
| 5,607,785 A | 3/1997 | Tozawa et al. |
| 5,624,769 A | 4/1997 | Li et al. |
| 5,629,104 A | 5/1997 | Crawford, Sr. et al. |
| 5,635,039 A | 6/1997 | Cisar et al. |
| 5,639,516 A | 6/1997 | Dirven et al. |
| 5,654,109 A | 8/1997 | Plowman et al. |
| 5,686,200 A | 11/1997 | Barton et al. |
| 5,707,755 A | 1/1998 | Grot |
| 5,733,678 A | 3/1998 | Ledjeff et al. |
| 5,736,269 A | 4/1998 | Okamoto et al. |
| 5,747,185 A | 5/1998 | Hsu |
| 5,750,281 A | 5/1998 | Washington et al. |
| 5,773,161 A | 6/1998 | Farooque et al. |
| 5,776,625 A | 7/1998 | Kaufman et al. |
| 5,789,091 A | 8/1998 | Wozniczka et al. |
| 5,789,094 A | 8/1998 | Kusunoki et al. |
| 5,795,671 A | 8/1998 | Nirasawa et al. |
| 5,798,187 A | 8/1998 | Wilson et al. |
| 5,804,328 A | 9/1998 | Odegard et al. |
| 5,827,602 A | 10/1998 | Koch et al. |
| 5,863,671 A | 1/1999 | Spear, Jr. et al. |
| 5,879,826 A | 3/1999 | Lehman et al. |
| 5,916,701 A | 6/1999 | Carter et al. |
| 5,925,039 A * | 7/1999 | Landingham .................. 606/41 |
| 5,964,991 A | 10/1999 | Kawasaki et al. |
| 5,972,530 A | 10/1999 | Shelekhin et al. |
| 5,989,741 A | 11/1999 | Bloomfield et al. |
| 5,993,987 A | 11/1999 | Wozniczka et al. |
| 5,998,057 A | 12/1999 | Koschany et al. |
| 6,001,502 A | 12/1999 | Walsh |
| 6,010,798 A | 1/2000 | Hammerschmidt et al. |
| 6,022,634 A | 2/2000 | Ramunni et al. |
| 6,024,848 A | 2/2000 | Dufner et al. |
| 6,025,457 A | 2/2000 | Ohno et al. |
| 6,030,718 A | 2/2000 | Fuglevand et al. |
| 6,037,072 A | 3/2000 | Wislon et al. |
| 6,037,073 A | 3/2000 | Besmann et al. |
| 6,040,072 A | 3/2000 | Murphy et al. |
| 6,040,076 A | 3/2000 | Reeder |
| 6,042,955 A | 3/2000 | Okamoto |
| 6,042,959 A | 3/2000 | Debe et al. |
| 6,051,331 A | 4/2000 | Spear, Jr. et al. |
| 6,051,343 A | 4/2000 | Suzuki et al. |
| 6,054,228 A | 4/2000 | Cisar et al. |
| 6,054,230 A | 4/2000 | Kato |
| 6,066,409 A | 5/2000 | Ronne et al. |
| 6,077,620 A | 6/2000 | Pettit |
| 6,080,290 A | 6/2000 | Stuart et al. |
| 6,083,638 A | 7/2000 | Taniguchi et al. |
| 6,087,028 A | 7/2000 | Goto |
| 6,096,449 A | 8/2000 | Fuglevand et al. |

| | | | | | | |
|---|---|---|---|---|---|---|
| 6,106,963 A | 8/2000 | Nitta et al. | | 6,663,992 B2 | 12/2003 | Lehnert et al. |
| 6,106,964 A | 8/2000 | Voss et al. | | 6,686,080 B2 | 2/2004 | Farkash et al. |
| 6,110,612 A | 8/2000 | Walsh | | 6,692,851 B2 | 2/2004 | Keskula et al. |
| 6,117,287 A | 9/2000 | Molter et al. | | 6,703,155 B2 | 3/2004 | Scartozzi |
| 6,117,577 A | 9/2000 | Wilson | | 6,716,549 B2 | 4/2004 | Bai et al. |
| 6,124,051 A | 9/2000 | Johnson | | 6,720,101 B1 | 4/2004 | Dong et al. |
| 6,132,895 A | 10/2000 | Pratt et al. | | 6,720,105 B2 | 4/2004 | Ohlsen et al. |
| 6,143,675 A | 11/2000 | McCollam et al. | | 6,733,913 B2 | 5/2004 | Cisar et al. |
| 6,146,780 A | 11/2000 | Cisar et al. | | 6,740,443 B2 | 5/2004 | Yamazaki et al. |
| 6,146,781 A | 11/2000 | Surampudi et al. | | 6,749,959 B2 | 6/2004 | Kaji et al. |
| 6,159,626 A | 12/2000 | Keskula et al. | | 6,761,990 B1 | 7/2004 | Yoshitake et al. |
| 6,171,374 B1 | 1/2001 | Barton et al. | | 6,764,786 B2 | 7/2004 | Morrow et al. |
| 6,171,720 B1 | 1/2001 | Besmann et al. | | 6,770,394 B2 | 8/2004 | Appleby et al. |
| 6,174,616 B1 | 1/2001 | Marvin et al. | | 6,779,351 B2 | 8/2004 | Maisotsenko et al. |
| 6,180,274 B1 | 1/2001 | Yoshimoto et al. | | 6,783,878 B2 | 8/2004 | Voss et al. |
| 6,180,275 B1 | 1/2001 | Braun et al. | | 6,794,068 B2 | 9/2004 | Rapaport et al. |
| 6,183,896 B1 | 2/2001 | Horita et al. | | 6,805,990 B2 | 10/2004 | Gorbell |
| 6,183,898 B1 | 2/2001 | Koschany et al. | | 6,808,832 B2 | 10/2004 | Suzuki et al. |
| 6,194,095 B1 | 2/2001 | Hockaday | | 6,828,057 B2 | 12/2004 | Ovshinsky et al. |
| 6,194,099 B1 | 2/2001 | Gernov et al. | | 6,828,062 B2 | 12/2004 | Lu et al. |
| 6,200,698 B1 | 3/2001 | Carlstrom, Jr. | | 6,838,202 B2 | 1/2005 | Brady et al. |
| 6,207,310 B1 | 3/2001 | Wilson et al. | | 6,838,205 B2 | 1/2005 | Cisar et al. |
| 6,207,312 B1 | 3/2001 | Wynne et al. | | 6,844,101 B2 | 1/2005 | Lee et al. |
| 6,214,487 B1 | 4/2001 | Kelley et al. | | 6,847,188 B2 | 1/2005 | Keskula et al. |
| 6,218,035 B1 | 4/2001 | Fuglevand et al. | | 6,852,437 B2 | 2/2005 | Cisar et al. |
| 6,218,039 B1 | 4/2001 | Mease et al. | | 6,855,450 B2 | 2/2005 | Molter et al. |
| 6,232,008 B1 | 5/2001 | Wozniczka et al. | | 6,863,838 B2 | 3/2005 | Hamrock |
| 6,235,168 B1 | 5/2001 | Strutt et al. | | 6,869,720 B2 | 3/2005 | Anderson et al. |
| 6,248,466 B1 | 6/2001 | Takahashi et al. | | 6,872,487 B2 | 3/2005 | Karichev |
| 6,248,469 B1 | 6/2001 | Formato et al. | | 6,887,610 B2 | 5/2005 | Elhamid et al. |
| RE37,284 E | 7/2001 | Li et al. | | 6,890,680 B2 | 5/2005 | Beckmann et al. |
| 6,255,012 B1 | 7/2001 | Wilson et al. | | 6,913,848 B2 | 7/2005 | Walsh |
| 6,280,870 B1 | 8/2001 | Eisman et al. | | 6,916,572 B2 | 7/2005 | Lundsgaard et al. |
| 6,280,883 B1 | 8/2001 | Lamanna et al. | | 6,926,981 B2 | 8/2005 | Voss |
| 6,287,717 B1 | 9/2001 | Cavalca et al. | | 6,939,636 B2 | 9/2005 | Fuglevand et al. |
| 6,291,094 B1 | 9/2001 | Yoshimura et al. | | 6,942,941 B2 | 9/2005 | Blunk et al. |
| 6,297,185 B1 | 10/2001 | Thompson et al. | | 6,951,698 B2 | 10/2005 | King |
| 6,322,914 B1 | 11/2001 | Chow et al. | | 6,955,862 B2 | 10/2005 | Hartnack et al. |
| 6,322,919 B1 | 11/2001 | Yang et al. | | 6,960,404 B2 | 11/2005 | Goebel |
| 6,329,093 B1 | 12/2001 | Ohara et al. | | 6,972,162 B2 * | 12/2005 | Gao et al. ............... 429/480 |
| 6,329,094 B1 | 12/2001 | Yasuo et al. | | 6,974,648 B2 | 12/2005 | Goebel |
| 6,350,539 B1 | 2/2002 | Wood, III et al. | | 6,986,959 B2 | 1/2006 | Clark et al. |
| 6,358,641 B1 | 3/2002 | Mease | | 6,989,216 B2 | 1/2006 | Puttaiah et al. |
| 6,365,293 B1 | 4/2002 | Isono et al. | | 7,001,687 B1 | 2/2006 | Gaines et al. |
| 6,372,376 B1 | 4/2002 | Fronk et al. | | 7,005,209 B1 | 2/2006 | Gaines et al. |
| 6,383,677 B1 | 5/2002 | Allen | | 7,014,947 B2 | 3/2006 | Speranza et al. |
| 6,387,556 B1 | 5/2002 | Fuglevand et al. | | 7,018,732 B2 | 3/2006 | Cargnelli et al. |
| 6,403,245 B1 | 6/2002 | Hunt | | 7,045,229 B2 | 5/2006 | Kobayashi et al. |
| 6,406,806 B1 | 6/2002 | Keskula et al. | | 7,067,209 B2 | 6/2006 | Breault |
| 6,410,180 B1 | 6/2002 | Cisar et al. | | 7,067,214 B2 | 6/2006 | Dave et al. |
| 6,416,895 B1 | 7/2002 | Voss et al. | | 7,070,874 B2 | 7/2006 | Blanchet et al. |
| 6,423,437 B1 | 7/2002 | Kenyon et al. | | 7,071,121 B2 | 7/2006 | Punsalan et al. |
| 6,425,993 B1 | 7/2002 | Debe et al. | | 7,078,117 B2 | 7/2006 | Mossman |
| 6,428,921 B1 | 8/2002 | Grot | | 7,087,327 B2 | 8/2006 | Pearson |
| 6,444,346 B1 | 9/2002 | Ohara et al. | | 7,157,177 B2 | 1/2007 | Chan |
| 6,451,469 B1 | 9/2002 | Nakamura et al. | | 7,160,642 B2 | 1/2007 | Tarver et al. |
| 6,451,471 B1 | 9/2002 | Braun | | 7,195,836 B2 | 3/2007 | Lisi et al. |
| 6,468,682 B1 | 10/2002 | Fuglevand et al. | | 7,205,057 B2 | 4/2007 | McLean |
| 6,485,854 B1 | 11/2002 | Grover et al. | | 7,205,062 B2 | 4/2007 | Tawfik et al. |
| 6,492,047 B1 | 12/2002 | Peled et al. | | 7,214,442 B2 | 5/2007 | Ramsey et al. |
| 6,497,975 B2 | 12/2002 | Bostaph et al. | | 7,247,398 B2 | 7/2007 | Logan et al. |
| 6,503,654 B2 | 1/2003 | Marchetti | | 7,270,906 B2 | 9/2007 | Haltiner, Jr. et al. |
| 6,506,511 B1 | 1/2003 | Lakeman et al. | | 7,294,425 B2 | 11/2007 | Hodge et al. |
| 6,524,452 B1 | 2/2003 | Clark et al. | | 7,297,428 B2 | 11/2007 | Saulsbury et al. |
| 6,531,238 B1 | 3/2003 | King | | 7,309,535 B2 | 12/2007 | Ovshinsky et al. |
| 6,531,241 B1 | 3/2003 | McEwen | | 7,309,539 B2 | 12/2007 | Kato et al. |
| 6,544,679 B1 | 4/2003 | Petillo et al. | | 7,833,645 B2 | 11/2010 | Fuglevand et al. |
| 6,566,004 B1 | 5/2003 | Fly et al. | | 2002/0045085 A1 | 4/2002 | Formato et al. |
| 6,602,631 B1 | 8/2003 | Cisar et al. | | 2002/0110726 A1 | 8/2002 | Busse et al. |
| 6,605,381 B1 | 8/2003 | Rosenmayer | | 2002/0127452 A1 | 9/2002 | Wilkinson et al. |
| 6,613,468 B2 | 9/2003 | Simpkins et al. | | 2002/0177039 A1 | 11/2002 | Lu et al. |
| 6,630,261 B2 | 10/2003 | Buchner et al. | | 2003/0013002 A1 | 1/2003 | Jankowski et al. |
| 6,635,378 B1 | 10/2003 | Yang et al. | | 2003/0035991 A1 | 2/2003 | Colombo et al. |
| 6,638,655 B2 | 10/2003 | Gyoten et al. | | 2003/0082431 A1 | 5/2003 | Klitsner et al. |
| 6,638,657 B1 | 10/2003 | Cisar et al. | | 2003/0087151 A1 | 5/2003 | Hamrock |
| 6,649,031 B1 | 11/2003 | Iqbal et al. | | 2003/0134178 A1 | 7/2003 | Larson |
| 6,653,009 B2 | 11/2003 | Wang et al. | | 2003/0170521 A1 | 9/2003 | Zhang |
| 6,656,624 B1 | 12/2003 | King | | 2003/0180603 A1 | 9/2003 | Richards |
| 6,660,419 B1 | 12/2003 | Nishida et al. | | 2003/0198861 A1 | 10/2003 | Bai et al. |

| | | |
|---|---|---|
| 2004/0033414 A1 | 2/2004 | Rohrl |
| 2004/0038105 A1 | 2/2004 | Hennige et al. |
| 2004/0043271 A1 | 3/2004 | Wilkinson et al. |
| 2004/0043279 A1 | 3/2004 | Rapaport et al. |
| 2004/0050713 A1 | 3/2004 | Chuang et al. |
| 2004/0054041 A1 | 3/2004 | Schmidt |
| 2004/0077519 A1 | 4/2004 | Price et al. |
| 2004/0086775 A1 | 5/2004 | Lloyd et al. |
| 2004/0214057 A1 | 10/2004 | Fuglevand et al. |
| 2005/0008912 A1 | 1/2005 | Yang et al. |
| 2005/0031925 A1 | 2/2005 | Ofer et al. |
| 2005/0069780 A1 | 3/2005 | Kinouchi et al. |
| 2005/0079403 A1 | 4/2005 | Lipka et al. |
| 2005/0084741 A1 | 4/2005 | Leddy et al. |
| 2005/0089733 A1 | 4/2005 | Punsalan et al. |
| 2005/0100662 A1 | 5/2005 | Ohba et al. |
| 2005/0103706 A1 | 5/2005 | Bennett et al. |
| 2005/0106440 A1 | 5/2005 | Komiya |
| 2005/0143517 A1 | 6/2005 | Schmidt |
| 2006/0014068 A1 | 1/2006 | Boysen et al. |
| 2006/0134498 A1 | 6/2006 | Hamm et al. |
| 2007/0117005 A1* | 5/2007 | Fuglevand et al. ............. 429/40 |
| 2008/0138684 A1 | 6/2008 | Lewinski et al. |
| 2009/0075149 A1 | 3/2009 | Haile et al. |
| 2009/0169939 A1 | 7/2009 | Devries |

FOREIGN PATENT DOCUMENTS

WO  PCT/US2006/39529  10/2006

OTHER PUBLICATIONS

U.S. Appl. No. 11/800,994, filed May 8, 2007, Spink et al.
U.S. Appl. No. 11/801,952, filed May 11, 2007, Fuglevand et al.
U.S. Appl. No. 11/811,624, filed Jun. 11, 2007, Spink et al.

* cited by examiner

DIRECT LIQUID FUEL CELL

RELATED APPLICATIONS FOR WHICH BENEFIT IS NOT CLAIMED

Attention is invited to the following related applications for which benefit is not claimed: U.S. patent application Ser. No. 11/284,173 filed Nov. 21, 2005 and entitled "Proton Exchange Membrane Fuel Cell and Method of Forming a Fuel Cell"; U.S. patent application Ser. No. 11/800,994 filed May 8, 2007 and entitled "Proton Exchange Membrane Fuel Cell Stack and Fuel Cell Module"; U.S. patent application Ser. No. 11/801,952 filed May 11, 2007 and entitled "Proton Exchange Membrane Fuel Cells and Electrodes"; U.S. patent application Ser. No. 11/811,624 filed Jun. 11, 2007 and entitled "Proton Exchange Membrane Fuel Cell"; each of which are incorporated by reference herein.

TECHNICAL FIELD

The present invention relates to a direct liquid fuel cell, and more specifically, to a direct liquid fuel cell comprising a fluid diffusion layer which consists, at least in part, of a porous electrically conductive ceramic material.

BACKGROUND OF THE INVENTION

A fuel cell is an electrochemical device which reacts hydrogen from a fuel source, and oxygen, which is usually derived from the ambient air, to produce electricity, water, and heat. The basic process is highly efficient, and since electricity is created without combustion, most prior art types of fuel cells emit no or very reduced emissions as compared to other electricity generators. Further, since fuel cells can be assembled into modules of various sizes, power systems have been developed to produce a wide range of electrical power outputs. As a result of these attributes, fuel cell power systems hold a great deal of promise as an environmentally friendly and viable source of electricity for a great number of applications. One of a number of known fuel cell technologies is the proton exchange membrane (PEM) fuel cell. The fundamental electrochemical process under which PEM fuel cells operate is well understood and known in the art. The PEM is the preferred fuel cell technology for all but the largest power output applications given its low operating temperature, relatively low cost, and minimal requirements with respect to balance of plant devices or other assemblies which are utilized in combination with the fuel cell to facilitate the efficient operation of the fuel cell.

One of the greatest challenges facing the widespread implementation of PEM fuel cells relates to the source of fuel which is utilized with same. Most PEM fuel cells operate on essentially pure hydrogen gas, which is relatively expensive and sometimes difficult to secure as compared to infrastructure hydrocarbon fuels such as gasoline or natural gas. A great deal of effort is underway to develop a commercially viable fuel processor or reformer, which converts infrastructure fuels, such as those mentioned above, into gaseous hydrogen for use in fuel cells. Notwithstanding recent research efforts, these reformer technologies are still very expensive and complex, since they are essentially small-scale refineries.

Another approach to the fuel source problem described above is the development of PEM fuel cells that can operate directly on liquid hydrocarbon fuels, such as aqueous methanol, ethanol, or dimethyl ether. This type of fuel cell is commonly referred to as a "direct alcohol," or sometimes more specifically, a "direct methanol" fuel cell, or "DMFC." Direct alcohol fuel cells are typically proton exchange membrane (PEM) fuel cells that can accommodate an aqueous hydrocarbon fuel applied directly to the anode side of the membrane electrode assembly (MEA). In these arrangements, a noble metal catalyst (typically platinum) is embedded in the electrode and is able to utilize or otherwise extract a proton from the liquid fuel and then facilitate the reaction of the proton with the oxygen provided on the cathode side of the MEA, which is derived from ambient air.

Prior art PEM fuel cells have been configured in a traditional stack arrangement or in a planar arrangement heretofore. One such planar arrangement is the cartridge configuration as seen in U.S. Pat. Nos. 6,030,718 and 6,468,682, both of these teachings are hereby incorporated by reference. One possible stack arrangement is seen in U.S. patent application Ser. No. 11/800,994, the teachings of which are also incorporated by reference herein. These prior art configurations may also be applicable for direct liquid PEM fuel cells. One end-use application for direct liquid fuel cells that appears especially promising is the replacement of conventional batteries in portable electronic devices, such as cell phones, laptop computers, digital music players, and the like. Small-scale, portable fuel cells offer the promise of greater run times for these devices and less environmental impact than traditional batteries. Given their normally small size, direct alcohol fuel cells are generally configured in a planar configuration, as opposed to a conventional stack. These fuel cells operate at relatively low temperatures and without any active cooling systems and are thus suitable for small-scale portable electronics applications.

One primary challenge for direct liquid fuel cell designers is the even distribution of the liquid fuel mixture or solution across the anode side of the MEA. In larger PEM fuel cells, this fuel distribution is typically done with complex fuel distribution channels which are formed into either a bipolar separator plate or an adjacent gas diffusion layer. Further, it should be understood that with PEM fuel cells which are fueled by gaseous hydrogen, the fuel flows quite easily through the fuel distribution channels due to its small molecular size. However, liquid fuels as described above do not disperse through fuel distribution channels as readily as hydrogen gas. Further, it should be understood that the complexity of the fuel distribution schemes for larger PEM fuel cells is often difficult to apply to smaller-scale direct liquid fuel cells.

One proposed solution to this problem is disclosed in U.S. Pat. No. 6,497,975 to Bostaph et al., the teachings of which are hereby incorporated by reference. In the reference to Bostaph, fuel and exhaust distribution channels are formed within a multilayered base component that communicates with the MEA. These channels form a flow field that is integrated into the fuel cell body during the manufacture of the body, and these flow fields distribute the liquid fuel across the face of the PEM anode. A similar approach is disclosed in U.S. Pat. No. 7,071,121 to Punsalan et al., the teachings of which are also incorporated by reference herein. In the reference to Punsalan, the fuel and exhaust channels are created in a ceramic electrode layer through a masked etching process that is similar to the method used to etch silicon wafers in semiconductor manufacturing. As with the reference to Bostaph, the channels are used as flow fields to distribute liquid or gaseous fuel across the face of a fuel cell anode. The problem with these approaches is that they are merely the same approach which was taken in larger PEM fuel cells and applied to a much smaller device. Additionally, it should be recognized that the attendant costs and complexity of such devices are not eliminated by this approach. Further, it should be understood that the distribution of the fuel across the anode is limited to the arrangement of the flow field channels.

A direct liquid fuel cell which avoids the shortcomings attendant with the prior art devices and practices utilized heretofore is the subject matter of the present application.

SUMMARY OF THE INVENTION

A first aspect of the present invention relates to a fuel cell which includes a proton exchange membrane electrode assembly with an anode side, and an opposite cathode side, and wherein the anode side has an active area surface; an anode fluid diffusion layer positioned adjacent to the anode side of the membrane electrode assembly, and which consists of, at least in part, a porous electrically conductive ceramic material which is substantially devoid of predetermined fluid passageways; and a source of an aqueous hydrocarbon fuel solution which is coupled in direct fluid flowing relation relative to the anode fluid diffusion layer, and wherein the anode fluid diffusion layer substantially evenly distributes the aqueous hydrocarbon fuel solution across the active area surface of the anode side of the membrane electrode assembly.

Another aspect of the present invention relates to a fuel cell which includes a proton exchange membrane electrode assembly having opposite anode and cathode sides, each defining an active area region; at least one porous, electrically conductive, ceramic fluid diffusion layer which is substantially devoid of predetermined passageways positioned in juxtaposed covering relation over at least a part of one of the active area regions defined by the anode and cathode sides; a source of an aqueous hydrocarbon fuel disposed in fluid flowing relation relative to the anode side of the proton exchange membrane electrode assembly; and a source of an oxidant disposed in fluid flowing relation relative to the cathode side of the proton exchange membrane electrode assembly; and wherein the operation of the fuel cell generates byproduct gasses on the anode side, and byproduct water on the cathode side, and wherein the porosities of the respective porous electrically conductive ceramic fluid diffusion layers are selected so as to facilitate the substantially even distribution of the aqueous hydrocarbon fuel over the active area of the anode side, while simultaneously facilitating the operationally effective dissipation of byproduct gasses from the active area region of the anode side, and the simultaneous retention of an operationally effective amount of byproduct water in the active area region of the cathode side so as to facilitate the operation of the fuel cell.

Still another aspect of the present invention relates to a fuel cell which includes a proton exchange membrane with an anode side and an opposite cathode side, and wherein the anode side and the cathode side each have an active area surface; an anode catalyst layer positioned in juxtaposed relation relative to the anode side of the proton exchange membrane; a cathode catalyst layer positioned in juxtaposed relation relative to the cathode side of the proton exchange membrane; an anode fluid diffusion layer positioned in juxtaposed relation relative to the anode catalyst layer, and which consists, at least in part, of a porous electrically conductive ceramic material which is substantially devoid of predetermined passageways; a cathode fluid diffusion layer positioned in juxtaposed relation relative to the cathode catalyst layer, and which consists, at least in part, of a porous electrically conductive ceramic material which is substantially devoid of predetermined passageways; a first current collecting separator plate positioned adjacent to the anode catalyst layer and having a region which is positioned in at least partially covering relation relative to the active area surface of the anode; and a second current collecting separator plate positioned adjacent to the cathode catalyst layer and having a region which is positioned in at least partially covering relation relative to the active area surface of the cathode, and wherein the regions of the first and second current collecting separator plates which are positioned in at least partial covering relation relative to the respective active area surfaces of the anode and cathode sides of the proton exchange membrane are substantially devoid of predetermined passageways for accommodating the flow of a flowable reactant.

Yet another aspect of the present invention relates to a fuel cell which includes a proton exchange membrane electrode assembly with an anode side, and an opposite cathode side; and at least one fluid diffusion layer disposed adjacent to either the anode or cathode sides of the proton exchange membrane electrode assembly, and wherein the at least one fluid diffusion layer is fabricated, at least in part, from a porous, electrically conductive ceramic material which is selected from the group consisting essentially of titanium diboride, zirconium diboride, molybdenum disilicide, titanium disilicide, titanium nitride, zirconium nitride, vanadium carbide, tungsten carbide, and composites, laminates, and solid solutions thereof.

Further, another aspect of the present invention relates to a fuel cell which includes a proton exchange membrane electrode assembly with an anode side and an opposite cathode side, and wherein the anode side the cathode sides each have an active area surface; an anode fluid diffusion layer positioned in juxtaposed relation relative to the anode side of the proton exchange membrane electrode assembly, and which consists, at least in part, of a porous electrically conductive ceramic material which is substantially devoid of predetermined passageways; a cathode fluid diffusion layer positioned in juxtaposed relation relative to the cathode side of the proton exchange membrane electrode assembly, and which consists, at least in part, of a porous electrically conductive ceramic material which is substantially devoid of predetermined passageways; a source of an aqueous hydrocarbon fuel solution which is coupled in direct fluid flowing relation relative to the anode fluid diffusion layer, and wherein the anode fluid diffusion layer substantially evenly distributes the aqueous hydrocarbon fuel solution across the active area surface of the anode side of the proton exchange membrane electrode assembly, and wherein the operation of the fuel cell generates byproduct gasses on the anode side and byproduct water on the cathode side, and wherein the anode fluid diffusion layer facilitates the operationally effective dissipation of byproduct gasses from the active area region of the anode side of the proton exchange membrane, and the cathode diffusion layer retains an operationally effective amount of byproduct water in the active area region of the cathode side of the proton exchange membrane over an ambient operating temperature range of less than about 60 degrees C.; a first current collecting separator plate positioned adjacent to the anode catalyst layer and having a region which is in partial covering relation relative thereto; and a second current collecting separator plate positioned adjacent to the cathode catalyst layer and having a region which is in partial covering relation relative thereto, and wherein the regions of the first and second current collecting separator plates which are in at least partial covering relation relative to the respective active area surfaces of the anode and cathode sides of the proton exchange membrane electrode assembly, are substantially devoid of predetermined passageways for accommodating the flow of the aqueous hydrocarbon fuel solution These and other aspects of the present invention will be described in greater detail hereinafter.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
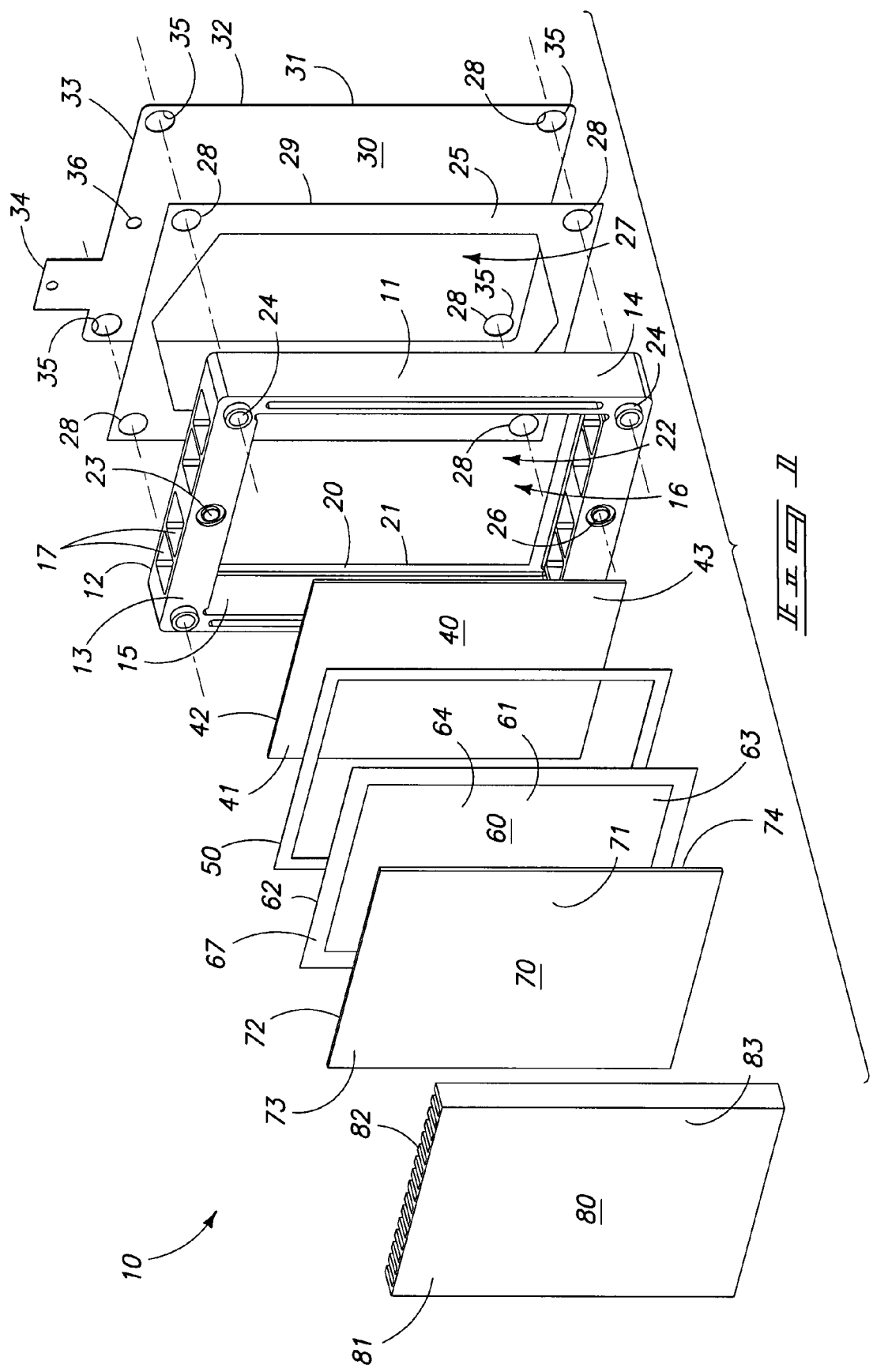
FIG. 1 is an exploded, perspective view of one possible form of a direct liquid fuel cell of the present invention.

Referring now to FIG. 1, a proton exchange membrane (PEM) fuel cell incorporating the features of the present invention is generally indicated by the numeral 10 therein. The fuel cell 10 as shown may be one module of a series of fuel cell modules which are combined together to form a fuel cell stack. Such a stack arrangement is fully described in U.S. patent application Ser. No. 11/800,994, which is hereby incorporated by reference. The fuel cell 10 may also be employed in a fuel cell arrangement such as that taught in U.S. Pat. Nos. 6,030,718 and 6,468,682. Both of the teachings of these earlier patents are hereby incorporated by reference. The fuel cell 10 as illustrated may also be employed as a single-cell version of a planar, small-scale fuel cell which can be used in portable electronic devices to replace conventional batteries.

Referring now to FIG. 1, the PEM fuel cell 10 of the present invention comprises a frame 11 with a first side 12, and an opposite second side 13. The first and second sides are disposed in predetermined spaced relation by an outside peripheral edge 14 which has a given width dimension, and an inside peripheral edge 15 which defines an internal cavity 16. A plurality of air passageways 17 are formed in the peripheral edge 14, and extend between the inside and outside peripheral edges 14 and 15, respectively. This air passageway 17 communicates with the internal cavity 16 thereof. The frame 11 also features a mounting flange 20 which is made integral with the inside peripheral edge 15 of the frame 11, and which extends into the internal cavity of the frame 16. The mounting flange 20 has an inside peripheral edge 21 that defines an aperture 22. The frame 11 has formed therein a liquid fuel passageway 23 which extends through the frame 11 and communicates with the internal cavity of the frame 16. A source of an aqueous, hydrocarbon-based liquid fuel (not shown), such as methanol, ethanol, or dimethyl-ether, is provided to the liquid fuel passageway 23. Still further, a plurality of fuel channels (not shown) are formed in the first side 12 of the frame 11, and which couple the fuel gas passageway 23 in fluid flowing relation relative to the internal cavity 16 of the frame 11 and to the internal cavity 16. Likewise, it will be recognized that the frame 11 further has formed therein an exhaust passageway 26 which extends through the frame 11 and communicates with the internal cavity of the frame 16. Similarly, a plurality of exhaust channels (not shown) are formed in the first side 12 of the frame 11, thereby coupling the internal cavity 16 in fluid flowing relation relative to the exhaust passageway 26. This frame is more fully described in the earlier mentioned U.S. patent application which is incorporated by reference herein.

Referring still to FIG. 1, the frame 11 further includes alignment or orientation posts or male members 24, which extend normally outwardly relative to the second side 13. These posts 24 are operable to be received in an aperture or receiving station formed in the front side 12 of an adjacent frame 11 so as to render the frames 11 of a stack substantially self aligning. The proton exchange membrane fuel cell 10 also includes a sealing member 25 which is sealably affixed to the first side 12 of the frame 11, and which is positioned adjacent to the outside peripheral edge 14 thereof. The sealing member defines a central aperture 27. Further, alignment apertures 28 are formed about the peripheral edge 29 of the sealing member 25, and are operable to receive the post 24 of an adjacent frame 11 therethrough when adjacent frames 11 are brought together in mating engagement.

Positioned in substantially sealing relation and in alignment relative to the frame 11 is a current collecting separator plate which is generally indicated by the numeral 30. The current collecting separator plate 30 is a non-porous, substantially smooth plate which normally is fabricated from an electrically conductive metal. The current collecting separator plate 30, which matingly cooperates with and is substantially self-aligning relative to the frame 11, has a first inside facing surface 31, and an opposite second, outside facing surface 32. When appropriately positioned relative to the first side 12 of the frame 11, the inside facing surface 31 is disposed in covering relation relative to and substantially seals the respective liquid fuel channels (not shown) and exhaust channels (not shown), respectively, thereby confining the reactants and any unused reactant, byproduct gasses, and/or water vapor to those channel regions. As seen in the drawings, the current collecting separator plate 30 is defined by a peripheral edge 33, and in some forms of the invention, the current collecting separator plate has an electrically conductive tab 34 which extends outwardly relative to the outside peripheral edge 14 of the frame 11 for purposes of allowing the removal of electricity. In one form of the invention as seen in FIG. 1, a plurality of alignment apertures 35, may be formed along the peripheral edge 33 of the current collector 30. This permits a post 24 of an adjacent frame 11 to extend therethrough so as to engage an adjacent frame 11. In some forms of the invention, the same current collecting separator plate 30 will have both a liquid fuel passageway 36, as well as an exhaust passageway (not shown) formed therein, and which will be substantially coaxially aligned relative to the liquid fuel and exhaust passageways 23 and 26, respectively, formed in the frame 11.

Figure 2:
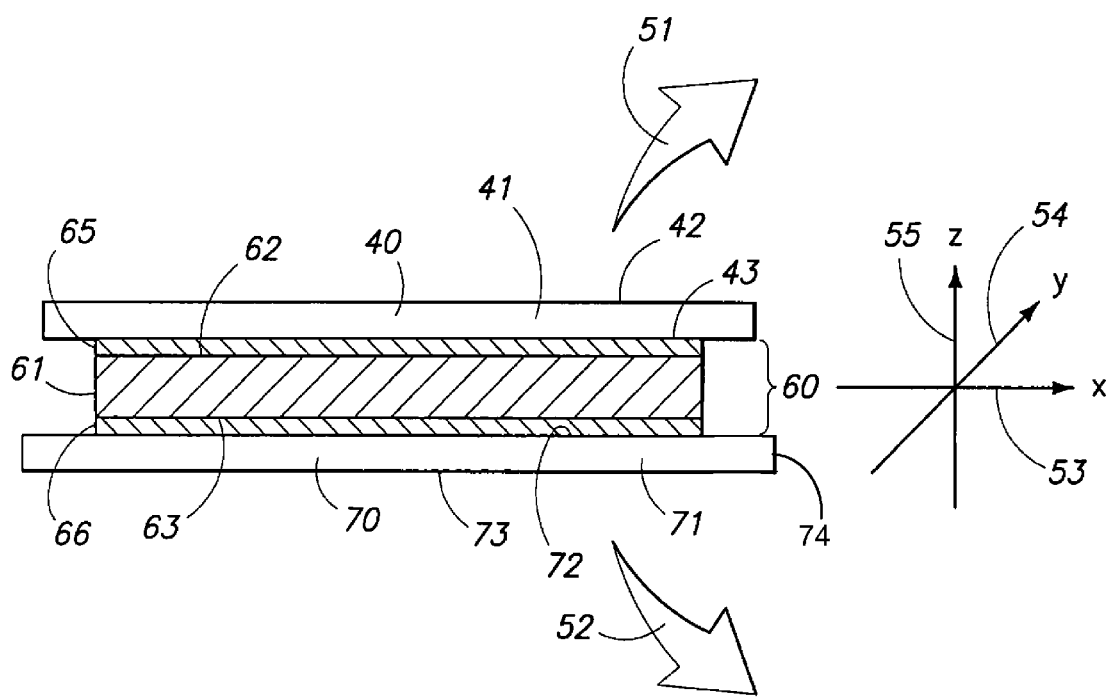
FIG. 2 is a greatly exaggerated, transverse, vertical sectional view of a direct liquid proton exchange membrane electrode assembly which is positioned between spaced ceramic fluid diffusion layers.

The proton exchange membrane fuel cell 10 includes and encloses within the frame 11, in an appropriate orientation, a porous anode fluid diffusion layer which is generally indicated by the numeral 40. In one possible form of the invention, the anode fluid diffusion layer comprises, at least in part, a porous electrically conductive ceramic material layer which is selected from the group consisting essentially of titanium diboride, zirconium diboride, molybdenum disilicide, titanium disilicide, titanium nitride, zirconium nitride, vanadium carbide, tungsten carbide, and composites, laminates, and solid solutions thereof. Additionally, the anode porous fluid diffusion layer 40 has a main body 41 which has an outside facing surface 42 which is positioned in a substantially coplanar orientation relative to the first side 12 of the frame 11, and a second, inside facing surface 43. As should be understood, the main body 41 is sized so as to substantially occlude the aperture 22 which is defined by the inside peripheral edge 21 of the mounting flange 20. It shall be understood that the liquid fuel channels (not shown) formed on the first side 12 of the frame 11, and which are coupled with the liquid fuel passageway 23, deliver a source of liquid fuel to the anode fluid diffusion layer 40. Moreover, the anode diffusion layer 40 is defined by x-axis 53, y-axis 54, and a z-axis 55, as shown in FIG. 2. In one form of the invention, the pore sizes defined by the porous, electrically conductive ceramic material for the anode diffusion layer 40 is substantially similar when measured in any one of the x, y, and/or z-axis. In another form of the invention, the porous, electrically conductive ceramic material for the anode diffusion layer 40 may define a range of pore sizes that differ when measured in any one of the x, y, and/or z-axis 53, 54 and/or 55.

A salient feature of the present invention is that the anode fluid diffusion layer 40 is substantially devoid of any predetermined fuel channels formed or defined within the ceramic material. As will be discussed below, liquid fuel delivered to the anode fluid diffusion layer 40 is effectively distributed evenly across the anode surface of the proton exchange membrane fuel cell 10. This lack of predetermined fuel channels formed within the fluid diffusion layer is in contrast to the predetermined fuel distribution channels which are taught in the prior art devices as discussed earlier in this application. The outside facing surface 42 of the first porous electrically conductive fluid diffusion layer 40 is placed into ohmic electrical contact thereagainst the inside facing surface 31 of the current collecting separator plate 30, which is sealably mounted on the first side 12. The present invention also includes a circumscribing anode seal 50, which is received within the internal cavity 16 of the frame 11, and which is fitted therealong, and rests in sealable contact thereagainst the mounting flange 20, and which sealably engages the porous electrically conductive anode fluid diffusion layer 40. The anode seal 50 may be formed from a pressure sensitive adhesive, or other means of sealing and bonding, the shape of which will generally follow that of the mounting flange 20.

Referring still to FIGS. 1 and 2, the present invention also includes a proton exchange membrane electrode assembly (PEM MEA) which is generally indicated by the numeral 60. The PEM MEA is well known in the art and further discussion regarding its composition and operation is not warranted other than to note that the PEM membrane used for direct liquid fuel cells often has a much thicker dimension than that used for hydrogen gas fuel cells due to the problems associated with the crossover of liquid fuel from the anode side to the cathode side of the membrane. Further, one skilled in the art will readily recognize that the PEM MEA, when operational, generates predominantly gaseous carbon dioxide 51 on the anode side and gaseous or liquid water 52 on the cathode side as byproducts during operation.

Referring now to FIG. 2, the MEA 60 comprises a proton exchange membrane 61 which has a first anode side 62, and has an opposite, second cathode side 63. Still further, the MEA is defined by an active area which is generally indicated by the numeral 64 (FIG. 1). An anode electrode catalyst layer 65 is applied to the active area 64 of the anode side 62 of the membrane 60. A cathode electrode catalyst layer 66 is applied to the active area 64 of the cathode side 63 of the membrane 60. The possible compositions of these electrode catalyst layers 65 and 66 are well known in the art, and the relative compositions of the anode and cathode electrode catalyst layers may differ. Also, as shown in FIG. 1, the MEA also includes a peripheral edge 67 which is outside of the active area 64 and which sealably rests thereagainst the anode seal 50 and thereby sealably secures the MEA to the mounting flange 20.

Referring now to FIG. 1, it will be understood that the fuel cell 10 further includes a porous, cathode fluid diffusion layer which is generally indicated by the numeral 70, and which is positioned within the internal cavity 16 of the frame 11, and which is further juxtaposed relative to the cathode side 63 of the proton exchange membrane 60. The cathode fluid diffusion layer 70 is typically fabricated from an electrically conductive ceramic material which may be similar to that which forms the porous anode fluid diffusion layer 40. However, in some forms of the invention, the compositions of the anode and cathode fluid diffusion layers 40 and 70 may differ. The cathode fluid diffusion layer 70 has a main body 71 which has a first inside facing surface 72, which lies in juxtaposed relation relative to the cathode side 63 of the MEA 60; and an opposite, second or outside facing surface 73. Still further, the main body 71 is defined by a peripheral edge 74. Moreover, the cathode diffusion layer 70 is defined by an x-axis 53, y-axis 54, and/or a z-axis 55, as shown in FIG. 2. In one form of the invention 10, the pore sizes defined by the porous, electrically conductive ceramic material used to fabricate the cathode diffusion layer 70 is substantially similar when measured in any one of the x, y, or z-axis 53, 54, or 55. In another form of the invention, the porous, electrically conductive ceramic material which is used for the cathode diffusion layer 70 may define a range of pore sizes that differ when measured in any one of the x, y and/or z-axes.

A salient feature of the present invention is that the cathode fluid diffusion layer 40 is substantially devoid of any predetermined channels formed or defined within the ceramic material. As seen in FIG. 2, the membrane electrode assembly 60 may be bonded therebetween the anode fluid diffusion layer 40 and the cathode fluid diffusion layer 70. In the form of the invention shown in FIG. 2, the porous cathode fluid diffusion layer 70 has a larger surface area than that of the porous electrically conductive ceramic anode fluid diffusion layer 40. In this arrangement, the size of the cathode fluid diffusion layer 70 is such that it substantially fully occludes the internal cavity 16 of the frame 11, whereas the anode fluid diffusion layer 40 has a surface area size such that it substantially fully occludes the smaller aperture 22, which is defined by the inner peripheral edge 21 of the MEA mounting flange 20.

As noted above, during operation of a PEM fuel cell, liquid or gaseous water is produced as a byproduct. In previous prior art devices, various schemes and arrangements have been devised so as to effectively manage the water which is produced by the proton exchange membrane so as to provide optimal electrical output from the operating fuel cell. One arrangement which has been employed heretofore was to provide various coatings of material to the fluid or gas diffusion layer positioned on the anode or cathode side of an MEA so as to give the fluid or gas diffusion layer a greater or lesser degree of hydrophobicity. By doing so, designers have attempted to retain a sufficient amount of water in the proton exchange membrane so as to maximize the electrical output of the fuel cell. Regardless of the schemes and methodology employed heretofore, fluid/gas diffusion layers have been designed so as to retain just enough water to maintain the proton exchange membrane in an optimally hydrated state, and while simultaneously removing excessive water from the proton exchange membrane so as to prevent same from flooding with water and effectively shutting down the electricity production of the fuel cell. Similarly, as discussed earlier, direct liquid PEM fuel cells also generate predominantly carbon dioxide as byproduct gasses on the anode side 62. Venting these gasses so as to extract them from the active area surface 64 of the proton exchange membrane 61 is critical for both maximizing electrical power output and to further prevent long-term degradation of the electrode catalysts which are employed with same. In previous prior art devices, various schemes and arrangements have been devised so as to effectively remove these byproduct gasses. One such scheme, as earlier noted, is the creation of channels and passageways formed either in the fluid diffusion layers or in other components of the fuel cell to provide a pathway to exhaust these gasses.

In the arrangement as discussed in the present application, it should be understood that the porous electrically conductive ceramic fluid diffusion layers 40 and 70 are fabricated from ceramic materials which are generally characterized as hydrophilic materials. In view of the hydrophilic nature of these materials, it was expected that water management issues would result from the use of a porous electrically conductive ceramic material. Through a mechanism which is not completely understood, it was surprisingly discovered that these same porous, electrically conductive ceramic materials employed in, for example, the anode and cathode gas diffusion layers 40 and 70, somehow retain enough water so as to maintain the proton exchange membrane 61 optimally hydrated while simultaneously allowing an operationally effective amount of gas to pass therethrough. Similarly, the porous electrically conductive ceramic material also facilitates the effective exhaust of the anode waste gasses without resorting to the use of any predetermined channels created in the fluid diffusion layer, or in any other component of the fuel cell. This feature, of course, greatly reduces the cost of fabricating this same component. The retention of some amount of water and the exhausting of anode byproduct gasses by the porous electrically conductive ceramic gas diffusion layers 40 and 70 to render a fuel cell operational is quite novel and unexpected in view of the manner in which ceramic materials have been utilized heretofore in prior art devices such as solid oxide fuel cells (SOFC). Moreover, initial testing of the present invention with the ceramic anode and cathode fluid diffusion layers 40 and 70 has shown an unexpected increase in the operating temperature range. For example, an identical direct-liquid PEM membrane utilizing carbon anode or cathode fluid diffusion layers would have a maximum operating temperature of approximately 46° C. In contrast, the same proton exchange membrane employing ceramic anode and cathode fluid diffusion layers can operate at temperatures of less than 60° C. without thermal runaway caused by dehydration of the proton exchange membrane. This unexpected feature allows a fuel cell 10 to operate at higher ambient temperature conditions. Heretofore, SOFC devices have employed porous electrically conductive ceramic materials to fabricate the anode and cathode of same. However, in the operation of SOFC devices, water cannot, nor need not be retained by the ceramic gas diffusion layers employed with same in view of the high operating temperatures (600-900° C.). Additionally, and while some amount of water is necessary to render a proton exchange membrane 61 operational, no water is necessary to render the ceramic electrolyte used in a SOFC operational, rather the high temperature of operation of a SOFC renders the electrolyte ionically conductive.

Referring again to FIG. 1, the present invention further includes an electrically conductive heat sink 80 having a thermally conductive mass and which is received within the internal cavity of the frame 11, and juxtaposed in ohmic electrical contact relative to the cathode fluid diffusion layer 70. As shown in FIG. 1, the heat sink 80 is oriented in fluid flowing relation relative to the air passageways 17 which are defined by the frame 11. It will be recognized by one skilled in the art that the heat sink 80 may take on various forms. For example, as seen in FIG. 1, the heat sink 80 of the present invention may comprise an extruded aluminum plate. However, the heat sink 80 may also comprise a reticulated electrically conductive metal foam, a corrugated or pleated metal heat sink of various forms, or could be fabricated from a metal mesh. The heat sink 80 includes a main body 81 which has an inwardly facing surface 82 which is juxtaposed relative to, and positioned in ohmic electrical contact thereagainst, the electrically conductive ceramic cathode fluid diffusion layer 70. Still further, the heat sink 80 has a second outwardly facing surface 83 which may placed in ohmic electrical contact with the current collecting separator plate 30 of an adjacent fuel cell 10, thus electrically coupling each of the fuel cells to form a stack. It should be understood that a second heat sink 80 may also be positioned juxtaposed relation relative to, and positioned in ohmic electrical contact thereagainst, the current collecting separator plate 30 of the same fuel cell 10 in a planar configuration to provide a cooling function for the anode side.

EXAMPLE

A single cell fuel cell was fabricated with a frame that has an active surface area measuring five square centimeters. The feed and purge orifices were enlarged as compared to a conventional hydrogen gas fuel cell to accommodate liquid fuel flow. The cell was configured so as to move a methanol-water fuel mixture from the bottom of the cell to the top thereof, and to accommodate an air flow moving in the opposite direction. The cell was assembled using properly sized, molybdenum disilicide ($MoSi_2$) ceramic fluid diffusion layers which were located on both the anode and the cathode sides. Both fluid diffusion layers were devoid of any flow channels. The membrane electrode assembly (MEA) used comprised Nafion 117®, which is up to ten times thicker than the proton exchange membrane used in hydrogen gas PEM fuel cells, so as to minimize the possibility of methanol cross-over from the anode to the cathode sides of the proton exchange membrane. The anode catalyst loading was about 4.0 $g/cm^2$ of platinum-ruthenium, and the cathode catalyst loading was about 2.0 $g/cm^2$ of platinum. Copper folded fin heat sinks were used on both the anode and cathode sides, and silver plated copper current collectors were used on both anode and cathode sides. After assembly, the cell was leak checked using about 6 psi of compressed air.

The fuel mixture comprised 10 mL of methanol mixed with 200 mL of distilled water, resulting in a concentration of about 3.7% methanol by weight. The fuel was fed to the anode side of the fuel cell using a manual pump and an automatic pump (LMI Milton Roy microprocessor dosing pump, model no. C901-94S) set to 50 strokes per minute. The fuel solution was manually delivered to the fuel cell, and an open circuit voltage of 634 mV was measured. The open circuit voltage varied slightly with the rate of fuel flow to the cell. Still using a manual pump, a semi-stable operating point was established at about 200 mA of output current. With steady injections of fuel, the output voltage eventually reached 230 mV with an intake air temperature varying from 20° C. to 40° C. Using the automatic pump, a polarization curve for the test cell indicated a peak output of 300 mV at a constant output current of 200 mA with intake air temperatures as high as 50° C. This performance is consistent with that expected for a direct alcohol fuel cell of this size. This clearly suggests that the fuel was evenly distributed across the anode, the anode byproduct gasses were effectively exhausted, and byproduct water was effectively retained so as to hydrate the membrane.

Operation

The operation of the described embodiment of the present invention is believed to be readily apparent and is briefly summarized at this point.

In one of its broadest aspects, the present invention relates to a direct liquid fuel cell 10 which includes a proton exchange membrane electrode assembly 60 with an anode side 62 and an opposite cathode side 63 and an active area surface 64. The fuel cell further has an anode fluid diffusion layer 40 positioned adjacent to the anode side 62 of the membrane electrode assembly 60, and which consists of, at least in part, a porous electrically conductive ceramic material which is substantially devoid of predetermined fluid passageways. A source of an aqueous hydrocarbon fuel solution, such as aqueous methanol, ethanol, or dimethyl ether, is coupled in direct fluid flowing relation relative to the anode fluid diffusion layer 40, and the anode fluid diffusion layer 40 substantially evenly distributes the aqueous hydrocarbon fuel solution across the active area surface 64 of the anode side 62 of the membrane electrode assembly 60. The porous, electrically conductive ceramic material may be titanium diboride, zirconium diboride, molybdenum disilicide, titanium disilicide, titanium nitride, zirconium nitride, vanadium carbide, tungsten carbide, and composites, laminates, and solid solutions thereof.

The direct liquid fuel cell 10 generates byproduct gasses 51 on the anode side 62 during operation, and the anode fluid diffusion layer 40 facilitates the operationally effective dissipation of those byproduct gasses 51 from the active area region 64 of the anode side 62 of the proton exchange membrane 61. Further, a cathode fluid diffusion layer 70 is positioned adjacent to the cathode side 63 of the proton exchange membrane electrode assembly 60. The cathode fluid diffusion layer 70 is also fabricated of, at least in part, a porous electrically conductive ceramic material which is substantially devoid of predetermined fluid passageways. The operation of the fuel cell 10 also generates water 52 as a byproduct on the cathode side 63 of the proton exchange membrane electrode assembly 60, and the cathode fluid diffusion layer 70 retains an operationally effective amount of water in the active area region 64 of the cathode side 63 of the proton exchange membrane electrode assembly 60. This allows the fuel cell 10 to operate over an ambient operating temperature range of less than about 60 degrees C.

The porous anode and cathode fluid diffusion layers 40 and 70 have an X, Y, and Z axis 53, 54 and 55. In some aspects of the invention, the pore sizes of either or both of the fluid diffusion layers are similar when measured in any one of the X, Y, and/or Z axes. In some aspects of the invention, the pore sizes of either or both of the fluid diffusion layers are dissimilar when measured in any one of the X, Y, and/or Z axes.

Another broad aspect of the present invention relates to a direct liquid fuel cell with a proton exchange membrane electrode assembly 60 having opposite anode and cathode sides, 61 and 62 respectively, each defining an active area region 64, and a porous, electrically conductive, ceramic fluid diffusion layer, 40 or 70, which is substantially devoid of predetermined passageways, positioned in juxtaposed covering relation over, at least a part, of one of the active area regions 64 defined by the anode and cathode sides 61 and 62 respectively. A source of an aqueous hydrocarbon fuel is disposed in fluid flowing relation relative to the anode side 61 of the proton exchange membrane electrode assembly 60, and a source of an oxidant (such as air) is disposed in fluid flowing relation relative to the cathode side 62 of the proton exchange membrane electrode assembly 60. The operation of the fuel cell 10 generates byproduct gasses 51 on the anode side 61, and byproduct water 52 on the cathode side 62. The porosities of the respective porous electrically conductive ceramic fluid diffusion layers are selected so as to facilitate the substantially even distribution of the aqueous hydrocarbon fuel over the active area 64 of the anode side 61, while simultaneously facilitating the operationally effective dissipation of byproduct gasses 51 from the active area region of the anode side 61, and the simultaneous retention of an operationally effective amount of byproduct water 52 in the active area region 64 of the cathode side 63 so as to facilitate the operation of the fuel cell 10.

Another broad aspect of the present invention relates to a direct liquid fuel cell 10 with a proton exchange membrane electrode assembly (MEA) 60 with an anode side 62 and an opposite cathode side 63, each having an active area surface 64. An anode fluid diffusion layer 40 is positioned in juxtaposed relation relative to the anode side 62 of MEA 60, and consists, at least in part, of a porous electrically conductive ceramic material which is substantially devoid of predetermined passageways. A cathode fluid diffusion layer 70 is positioned in juxtaposed relation relative to the cathode side 63 of the MEA 60, and also consists, at least in part, of a porous electrically conductive ceramic material which is substantially devoid of predetermined passageways. A source of an aqueous hydrocarbon fuel solution is coupled in direct fluid flowing relation relative to the anode fluid diffusion layer 40, which substantially evenly distributes the aqueous hydrocarbon fuel solution across the active area surface 64 of the anode side 62 of the MEA 60. The operation of the fuel cell 10 generates byproduct gasses 51 on the anode side 62 and byproduct water 52 on the cathode side 63. The anode fluid diffusion layer 40 facilitates the operationally effective dissipation of byproduct gasses 51 from the active area region 64 of the anode side 62 of the proton exchange membrane 61, and the cathode diffusion layer 63 retains an operationally effective amount of byproduct water 52 in the active area region 64 of the cathode side 63 of the proton exchange membrane 61 over an ambient operating temperature range of less than about 60 degrees C. Also, a first current collecting separator plate 30 is positioned adjacent to the anode catalyst layer 65 and is in partial covering relation relative thereto; and a second current collecting separator plate 30 is positioned adjacent to the cathode catalyst layer 66 and is in partial covering relation relative thereto. The regions of the first and second current collecting separator plates 30 are substantially devoid of predetermined passageways for accommodating the flow of the aqueous hydrocarbon fuel solution.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A fuel cell, comprising:
   a proton exchange membrane electrode assembly with an anode side and an opposite cathode side, and wherein the anode side has an active area;
   an anode fluid diffusion layer positioned adjacent to the anode side of the proton exchange membrane electrode assembly, and which consists of, at least in part, a porous electrically conductive ceramic material which is substantially devoid of predetermined fluid passageways; and
   a source of an aqueous hydrocarbon fuel solution which is coupled in direct fluid flowing relation relative to the anode fluid diffusion layer, and wherein the anode fluid diffusion layer substantially evenly distributes the aqueous hydrocarbon fuel solution across the active area of the anode side of the proton exchange membrane electrode assembly.

2. The fuel cell as claimed in claim 1, and wherein the fuel cell generates byproduct gasses during operation on the anode side, and the anode fluid diffusion layer facilitates the operationally effective dissipation of byproduct gasses from the active area of the anode side of the proton exchange membrane electrode assembly.

3. The fuel cell as claimed in claim 2, and wherein the anode fluid diffusion layer has an X, Y, and Z axis, and a range of pore sizes which dissimilar when measured in any one of the X, Y, and/or Z axes.

4. The fuel cell as claimed in claim 2, and further comprising a cathode fluid diffusion layer positioned adjacent to the cathode side of the proton exchange membrane electrode assembly, and which is fabricated of, at least in part, a porous electrically conductive ceramic material which is substantially devoid of predetermined fluid passageways.

5. The fuel cell as claimed in claim 4, and wherein the operation of the fuel cell generates water as a byproduct on the cathode side of the proton exchange membrane electrode assembly, and the cathode fluid diffusion layer retains an operationally effective amount of water in an active area of the cathode side of the proton exchange membrane electrode assembly.

6. The fuel cell as claimed in claim 5, and wherein the proton exchange membrane electrode assembly has an ambient operating temperature, and wherein the cathode fluid diffusion layer retains an operationally effective amount of water in the active area of the cathode side of the proton exchange membrane electrode assembly over an ambient operating temperature range of less than about 60 degrees C.

7. The fuel cell as claimed in claim 4, and wherein the cathode fluid diffusion layer has an X, Y, and Z axis, and a range of pore sizes which is dissimilar when measured in any one of the X, Y, and/or Z axes.

8. The fuel cell as claimed in claim 4, and wherein at least one of the anode or cathode fluid diffusion layers is fabricated from a porous, electrically conductive ceramic material which is selected from the group consisting essentially of titanium diboride, zirconium diboride, molybdenum disilicide, titanium disilicide, titanium nitride, zirconium nitride, vanadium carbide, tungsten carbide, and composites, laminates, and solid solutions thereof.

9. The fuel cell as claimed in claim 1, and wherein the aqueous hydrocarbon fuel solution is selected from the group consisting essentially of aqueous methanol, aqueous ethanol, and aqueous dimethyl ether.

10. A fuel cell, comprising:
a proton exchange membrane electrode assembly having opposite anode and cathode sides, each defining an active area;
at least one porous, electrically conductive, ceramic fluid diffusion layer which is substantially devoid of predetermined passageways positioned in juxtaposed covering relation over at least a part of one of the active areas defined by the anode and cathode sides;
a source of an aqueous hydrocarbon fuel disposed in fluid flowing relation relative to the anode side of the proton exchange membrane electrode assembly; and
a source of an oxidant disposed in fluid flowing relation relative to the cathode side of the proton exchange membrane electrode assembly; and wherein the operation of the fuel cell generates byproduct gasses on the anode side, and byproduct water on the cathode side, and wherein the porosities of the respective porous electrically conductive ceramic fluid diffusion layers are selected so as to facilitate the substantially even distribution of the aqueous hydrocarbon fuel over the active area of the anode side, while simultaneously facilitating the operationally effective dissipation of byproduct gasses from the active area of the anode side, and the simultaneous retention of an operationally effective amount of byproduct water in the active area of the cathode side so as to facilitate the operation of the fuel cell.

11. The fuel cell as claimed in claim 10, and wherein the aqueous hydrocarbon fuel is selected from the group consisting essentially of aqueous methanol, aqueous ethanol, and aqueous dimethyl ether.

12. The fuel cell as claimed in claim 10, and wherein the at least one porous, electrically conductive, ceramic fluid diffusion layer is fabricated from a ceramic material which is selected from the group consisting essentially of titanium diboride, zirconium diboride, molybdenum disilicide, titanium disilicide, titanium nitride, zirconium nitride, vanadium carbide, tungsten carbide, and composites, laminates, and solid solutions thereof.

13. A fuel cell comprising:
a proton exchange membrane with an anode side and an opposite cathode side, and wherein the anode side and the cathode side each have an active area;
an anode catalyst layer positioned in juxtaposed relation relative to the anode side of the proton exchange membrane;
a cathode catalyst layer positioned in juxtaposed relation relative to the cathode side of the proton exchange membrane;
an anode fluid diffusion layer positioned in juxtaposed relation relative to the anode catalyst layer, and which consists, at least in part, of a porous electrically conductive ceramic material which is substantially devoid of predetermined passageways;
a cathode fluid diffusion layer positioned in juxtaposed relation relative to the cathode catalyst layer, and which consists, at least in part, of a porous electrically conductive ceramic material which is substantially devoid of predetermined passageways;
a first current collecting separator plate positioned adjacent to the anode catalyst layer and having a region which is positioned in at least partially covering relation relative to the active area of the anode side; and
a second current collecting separator plate positioned adjacent to the cathode catalyst layer and having a region which is positioned in at least partially covering relation relative to the active area of the cathode side, and wherein the regions of the first and second current collecting separator plates which are positioned in at least partial covering relation relative to the respective active areas of the anode and cathode sides of the proton exchange membrane are substantially devoid of predetermined passageways for accommodating the flow of a flowable reactant.

14. The fuel cell as claimed in claim 13, and further comprising a source of an aqueous hydrocarbon fuel solution which is coupled in direct fluid flowing relation relative to the anode fluid diffusion layer, and wherein the anode fluid diffusion layer substantially evenly distributes the aqueous hydrocarbon fuel solution across the active area of the anode side of the proton exchange membrane.

15. The fuel cell as claimed in claim 14, and wherein the aqueous hydrocarbon fuel solution is selected from the group consisting essentially of aqueous methanol, aqueous ethanol, and aqueous dimethyl ether.

16. The fuel cell as claimed in claim 13, and wherein the operation of the fuel cell generates byproduct gasses on the anode side, and byproduct water on the cathode side, and wherein the anode fluid diffusion layer facilitates the operationally effective dissipation of byproduct gasses from the active area of the anode side of the proton exchange membrane, and the cathode fluid diffusion layer retains an operationally effective amount of byproduct water in the active area of the cathode side of the proton exchange membrane so as to facilitate the operation of the fuel cell.

17. A fuel cell, comprising:
a proton exchange membrane electrode assembly with an anode side, and an opposite cathode side;
at least one fluid diffusion layer disposed adjacent to the anode side of the proton exchange membrane electrode assembly, and wherein the at least one fluid diffusion layer is fabricated, at least in part, from a porous, electrically conductive ceramic material which is selected from the group consisting essentially of titanium diboride, zirconium diboride, molybdenum disilicide, titanium disilicide, titanium nitride, zirconium nitride, vanadium carbide, tungsten carbide, and composites, laminates, and solid solutions thereof, wherein the at least one fluid diffusion layer is substantially devoid of predetermined fluid passageways; and,
a source of an aqueous hydrocarbon fuel solution which is coupled in direct fluid flowing relation relative to the at least one fluid diffusion layer, and wherein the at least one fluid diffusion layer substantially evenly distributes the aqueous hydrocarbon fuel solution across an active area of the anode side of the proton exchange membrane electrode assembly.

18. The fuel cell as claimed in claim 17, and wherein the operation of the fuel cell generates byproduct gasses on the anode side of the proton exchange membrane electrode assembly, and the fluid diffusion layer on the anode side facilitates the operationally effective dissipation of byproduct gasses from the active area of the anode side of the proton exchange membrane electrode assembly.

19. The fuel cell as claimed in claim 17, wherein the at least one fluid diffusion layer comprises another fluid diffusion layer that is disposed adjacent to the cathode side of the proton exchange membrane electrode assembly, and wherein the another fluid diffusion layer is substantially devoid of predetermined fluid passageways.

20. The fuel cell as claimed in claim 19, and wherein the operation of the fuel cell generates byproduct water on the cathode side of the proton exchange membrane electrode assembly, and the diffusion layer retains an operationally effective amount of byproduct water in an active area of the cathode side of the proton exchange membrane electrode assembly so as to facilitate the operation of the fuel cell.

21. A fuel cell comprising:
a proton exchange membrane electrode assembly with an anode side and an opposite cathode side, and wherein the anode side and the cathode side each have an active area;
an anode fluid diffusion layer positioned in juxtaposed relation relative to the anode side of the proton exchange membrane electrode assembly, and which consists, at least in part, of a porous electrically conductive ceramic material which is substantially devoid of predetermined passageways;
a cathode fluid diffusion layer positioned in juxtaposed relation relative to the cathode side of the proton exchange membrane electrode assembly, and which consists, at least in part, of a porous electrically conductive ceramic material which is substantially devoid of predetermined passageways;
a source of an aqueous hydrocarbon fuel solution which is coupled in direct fluid flowing relation relative to the anode fluid diffusion layer, and wherein the anode fluid diffusion layer substantially evenly distributes the aqueous hydrocarbon fuel solution across the active area of the anode side of the proton exchange membrane electrode assembly, and wherein the operation of the fuel cell generates byproduct gasses on the anode side and byproduct water on the cathode side, and wherein the anode fluid diffusion layer facilitates the operationally effective dissipation of byproduct gasses from the active area of the anode side of the proton exchange membrane, and the cathode diffusion layer retains an operationally effective amount of byproduct water in the active area of the cathode side of the proton exchange membrane over an ambient operating temperature range of less than about 60 degrees C.;
a first current collecting separator plate positioned adjacent to the anode side and having a region which is in partial covering relation relative thereto; and
a second current collecting separator plate positioned adjacent to the cathode side and having a region which is in partial covering relation relative thereto, and wherein the regions of the first and second current collecting separator plates which are in at least partial covering relation relative to the respective active areas of the anode and cathode sides of the proton exchange membrane electrode assembly, are substantially devoid of predetermined passageways for accommodating the flow of the aqueous hydrocarbon fuel solution.

22. The fuel cell system as claimed in claim 21, and wherein at least one of the anode or cathode fluid diffusion layers is fabricated from a ceramic material which is selected from the group consisting essentially of titanium diboride, zirconium diboride, molybdenum disilicide, titanium disilicide, titanium nitride, zirconium nitride, vanadium carbide, tungsten carbide, and composites, laminates, and solid solutions thereof.

23. The fuel cell as claimed in claim 21, and wherein the aqueous hydrocarbon fuel solution is selected from the group consisting essentially of aqueous methanol, aqueous ethanol, and aqueous dimethyl ether.

* * * * *